United States Patent
Lin et al.

(10) Patent No.: US 12,556,026 B2
(45) Date of Patent: Feb. 17, 2026

(54) METHOD FOR DETECTING WHETHER A BATTERY IS DISCONNECTED, AN ONLINE UNINTERRUPTIBLE POWER SYSTEM AND AN OFFLINE UNINTERRUPTIBLE POWER SYSTEM USING THE METHOD

(71) Applicant: CYBER POWER SYSTEMS, INC., Taipei (TW)

(72) Inventors: Ming-Chuan Lin, Taipei (TW); Jung-Hua Weng, Taipei (TW); Yu-Chieh Kung, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 307 days.

(21) Appl. No.: 18/493,048

(22) Filed: Oct. 24, 2023

(65) Prior Publication Data
US 2025/0062637 A1  Feb. 20, 2025

(30) Foreign Application Priority Data
Aug. 17, 2023  (CN) .......................... 202311037928.2

(51) Int. Cl.
*H02J 9/06* (2006.01)
*H02J 7/00* (2006.01)
*H02M 3/157* (2006.01)

(52) U.S. Cl.
CPC .......... *H02J 9/061* (2013.01); *H02J 7/00714* (2020.01); *H02J 7/007182* (2020.01); *H02M 3/157* (2013.01)

(58) Field of Classification Search
CPC .. H02J 9/061; H02J 7/007182; H02J 7/00714; H02M 3/157
See application file for complete search history.

(56) References Cited

U.S. PATENT DOCUMENTS

2002/0031000 A1* 3/2002 Sakai ...................... H02J 9/062
363/65

* cited by examiner

*Primary Examiner* — Carlos Amaya
(74) *Attorney, Agent, or Firm* — BACON&THOMAS,PLLC

(57) ABSTRACT

A method for detecting whether a battery is disconnected, an online UPS and an offline UPS using the method. The method comprises the following steps: determining whether a charging circuit charging a battery is in a constant voltage charging mode; and when the determination result is yes, executing a battery disconnection detection, which comprising the following steps: alternately performing a first operation and a second operation on a PWM signal, wherein the duty cycle of the PWM signal is used to control the output voltage of the charging circuit, the first operation is increasing the duty cycle of the PWM signal by a first preset value for a first preset time, and the second operation is reverting the PWM signal to the original duty cycle for a second preset time; and determining whether the voltage at the output terminal of the charging circuit rises and reaches a second preset value.

25 Claims, 9 Drawing Sheets

METHOD FOR DETECTING WHETHER A BATTERY IS DISCONNECTED, AN ONLINE UNINTERRUPTIBLE POWER SYSTEM AND AN OFFLINE UNINTERRUPTIBLE POWER SYSTEM USING THE METHOD

BACKGROUND OF THE INVENTION

Field of the Invention

The present invention relates to the technical field of battery detection, and in particular, to a method for detecting whether a battery is disconnected, an online uninterruptible power system (online UPS) and an offline uninterruptible power system (offline UPS) using the method.

Description of Related Art

Generally speaking, when a UPS is charging a battery (such as a lead-acid battery), it will detect whether the battery is disconnected at any time. However, whenever the battery is fully charged or nearly fully charged, the UPS cannot detect whether the battery is disconnected. In order to ensure the normal operation of the UPS, the above issues need to be resolved urgently.

SUMMARY OF THE INVENTION

An object of the present invention is to provide a method for detecting whether a battery is disconnected, which can solve the aforementioned issues.

Another object of the present invention is to provide an online UPS using the above method.

Still another object of the present invention is to provide an offline UPS using the above method.

In order to achieve the above object, the present invention provides a method for detecting whether the battery is disconnected, which comprises the following steps: determining whether a charging circuit charging a battery is in a constant voltage charging mode; and when the determination result is yes, executing a battery disconnection detection. The battery disconnection detection comprises the following steps: alternately performing a first operation and a second operation on a PWM signal, wherein the duty cycle of the PWM signal is used to control the output voltage of the charging circuit, the first operation is increasing the duty cycle of the PWM signal by a first preset value for a first preset time, and the second operation is reverting the PWM signal to the original duty cycle for a second preset time; and determining whether the voltage at the output terminal of the charging circuit rises and reaches a second preset value.

In order to achieve the above another object, the present invention provides an online UPS, which comprises a charging circuit, a sensing circuit and a control unit, wherein the control unit comprises a digital control circuit and a driving circuit. The charging circuit is configured for performing a DC-DC conversion operation and for charging a battery. The sensing circuit is configured for sensing an output of the charging circuit to generate a sensing result. The digital control circuit is configured for generating a PWM signal according to the sensing result. A duty cycle of the PWM signal is used to control an output voltage of the charging circuit. The driving circuit is configured for generating a driving signal to drive the charging circuit according to the PWM signal. Wherein when the digital control circuit determines that the charging circuit is in a constant voltage charging mode according to the sensing result, the digital control circuit executes a battery disconnection detection. The battery disconnection detection comprises the following steps: alternately performing a first operation and a second operation on the PWM signal, wherein the first operation is increasing the duty cycle of the PWM signal by a first preset value for a first preset time, and the second operation is reverting the PWM signal to an original duty cycle for a second preset time; and determining whether the voltage at the output terminal of the charging circuit rises and reaches a second preset value.

In order to achieve the above still another object, the present invention provides an offline UPS, which comprises a charging circuit, a sensing circuit and a control unit, wherein the control unit comprises a digital control circuit and a driving circuit. The charging circuit is configured for performing an AC-DC conversion operation, and an output of the charging circuit is used to charge a battery and used as a system power. The sensing circuit is configured for sensing the output of the charging circuit to generate a sensing result. The digital control circuit is configured for generating a PWM signal according to the sensing result. A duty cycle of the PWM signal is used to control an output voltage of the charging circuit. The digital control circuit further has a function of stabilizing the output voltage of the charging circuit. The driving circuit is configured for generating a driving signal to drive the charging circuit according to the PWM signal. Wherein when the digital control circuit determines that the charging circuit is in a constant voltage charging mode according to the sensing result, the digital control circuit executes a battery disconnection detection. The battery disconnection detection comprises the following steps: alternately performing a first operation and a second operation on the PWM signal, wherein the first operation is increasing the duty cycle of the PWM signal by a first preset value for a first preset time, and stopping the function of stabilizing the output voltage of the charging circuit during the first preset time, and the second operation is reverting the PWM signal to an original duty cycle for a second preset time; determining whether a voltage at an output terminal of the charging circuit rises and reaches a second preset value: stopping performing the first operation and the second operation when the voltage at the output terminal of the charging circuit reaches the second preset value, and increasing the duty cycle of the PWM signal, thereby making a target level of the output voltage of the charging circuit rising to a third preset value and keeping for a third preset time, wherein the third preset value is greater than the second preset value; and determining whether the voltage at the output terminal of the charging circuit still reaches the second preset value within the third preset time.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
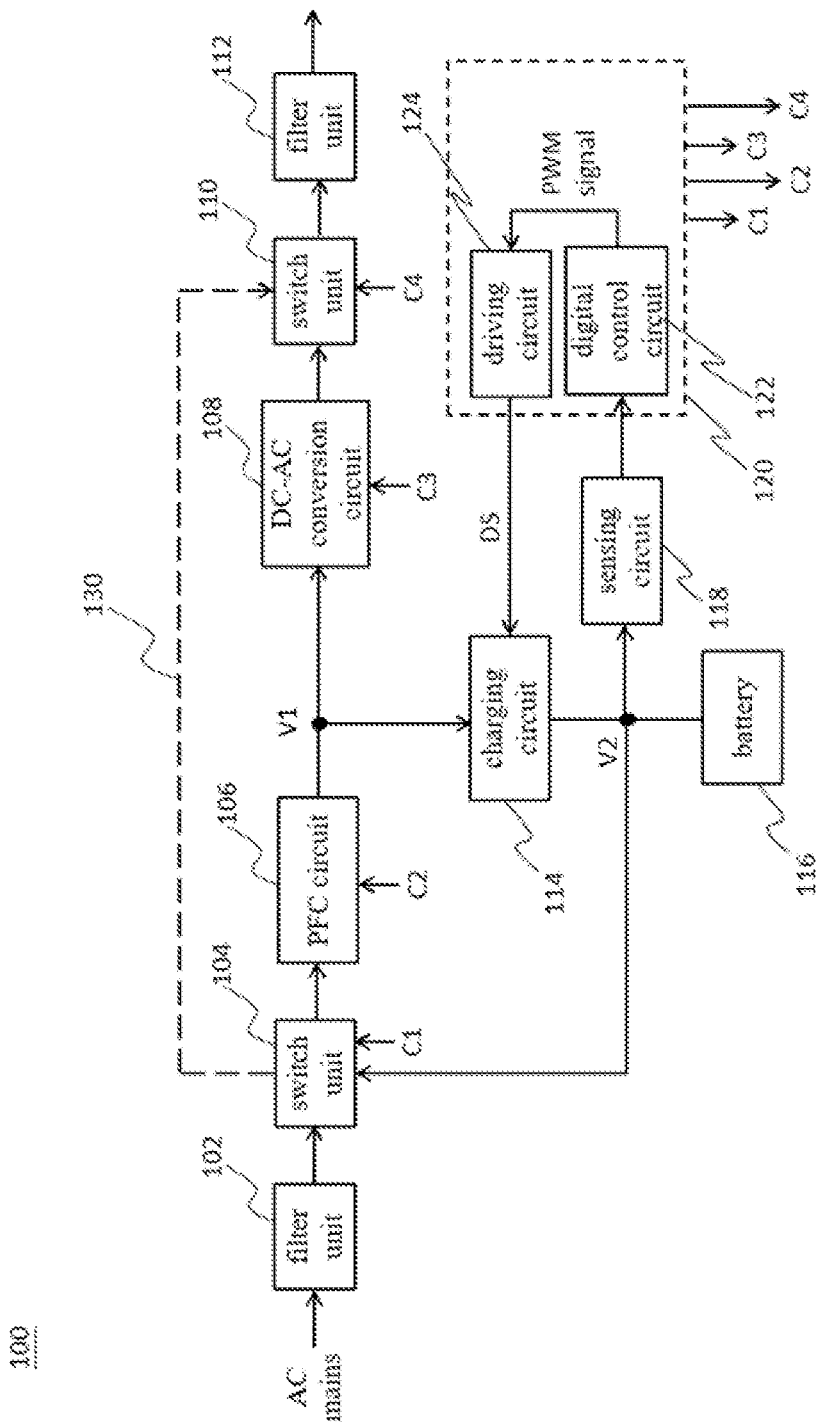
FIG. 1 illustrates an online UPS according to an embodiment of the present invention.

FIG. 1 illustrates an online UPS according to an embodiment of the present invention. As shown in FIG. 1, the online UPS 100 comprises a filter unit 102, a switch unit 104, a power factor correction circuit (PFC circuit) 106, a DC-AC conversion circuit 108, a switch unit 110, a filter unit 112, a charging circuit 114, a battery 116, a sensing circuit 118, a control unit 120 and a bypass path 130, wherein the control unit 120 comprises a digital control circuit 122 and a driving circuit 124. An input terminal of the filter unit 102 is used as an input terminal of the online UPS 100 and is electrically coupled to AC mains, and an output terminal of the filter unit 112 is used as an output terminal of the online UPS 100. The electrical coupling relationship of the above-mentioned elements is shown in FIG. 1, which will not be repeated here. In addition, although in this embodiment, the battery 116 is configured inside the online UPS 100, this is not intended to limit the present invention. Those skilled in the art should know that the battery 116 can also be configured outside the online UPS 100.

The control unit 120 uses the control signals C1, C2, C3 and C4 to respectively control the operation of the switch unit 104, the power factor correction circuit 106, the DC-AC conversion circuit 108 and the switch unit 110. For example, the control unit 120 uses the control signal C1 to control the operation of the switch unit 104, so as to electrically couple an output terminal of the filter unit 102 to an input terminal of the power factor correction circuit 106, to electrically couple the output terminal of the filter unit 102 to the bypass path 130, or to electrically couple the battery 116 to the input terminal of the power factor correction circuit 106. For another example, the control unit 120 uses the control signal C4 to control the operation of the switch unit 110, so as to electrically couple an input terminal of the filter unit 112 to an output terminal of the DC-AC conversion circuit 108, or to electrically couple the input terminal of the filter unit 112 to the bypass path 130.

In this embodiment, the charging circuit 114 is configured for performing a DC-DC conversion operation and for charging the battery 116. The sensing circuit 118 is configured for sensing an output (for example, sensing voltage and current) of the charging circuit 114 to generate a sensing result. The digital control circuit 122 is configured for generating a pulse-width modulation signal (PWM signal) according to the sensing result. A duty cycle of the PWM signal is used to control an output voltage of the charging circuit 114. The driving circuit 124 is configured for generating a driving signal DS to drive the charging circuit 114 according to the PWM signal.

Figure 2:
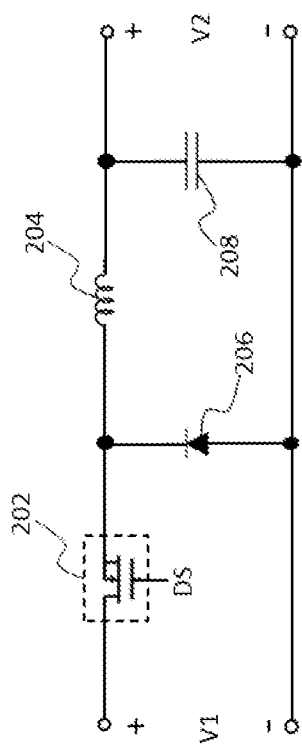
FIG. 2 illustrates one embodiment of the charging circuit 114.

FIG. 2 illustrates one embodiment of the charging circuit 114. As shown in FIG. 2, the charging circuit 114 is a step-down DC-DC conversion circuit (i.e., buck converter), which comprises a switch 202, an inductor 204, a diode 206 and a capacitor 208. In addition, in this embodiment, the switch 202 is implemented by an N-type metal-oxide-semiconductor field-effect transistor (i.e., N-type MOSFET). A gate of the N-type MOSFET is used as a control terminal of the switch 202 and used for receiving the driving signal DS outputted by the driving circuit 124. In addition, in FIG. 2, V1 represents a voltage at an input terminal of the charging circuit 114, and V2 represents a voltage at an output terminal of the charging circuit 114. The electrical coupling relationship of the above-mentioned components is shown in FIG. 2, which will not be repeated here. It is worth mentioning that, in other embodiments, the charging circuit 114 may also be implemented by a step-up DC-DC conversion circuit (i.e., boost converter).

Figure 3:
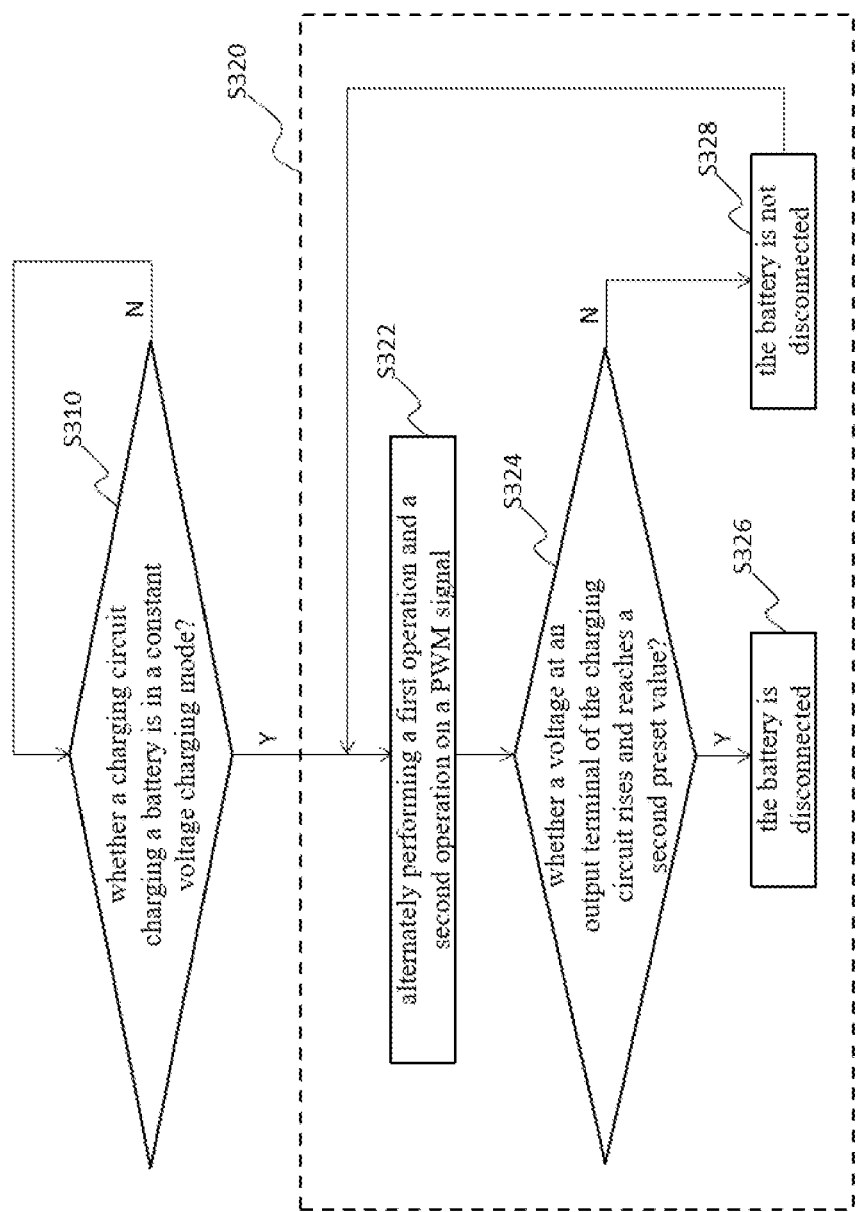
FIG. 3 is a flowchart of a method for detecting whether a battery is disconnected according to an embodiment of the present invention.

FIG. 3 is a flowchart of a method for detecting whether a battery is disconnected according to an embodiment of the present invention. Please refer to FIGS. 1 and 3. First, the digital control circuit 122 determines whether the charging circuit 114 is in a constant voltage charging mode according to the sensing result outputted by the sensing circuit 118 (as shown in step S310). When the charging circuit 114 is in the constant voltage charging mode, it means that the battery 116 is fully charged, or nearly fully charged. In this embodiment, the digital control circuit 122 can obtain information related to the voltage V2 at the output terminal of the charging circuit 114 from the sensing result, and determine whether the charging circuit 114 is in the constant voltage charging mode. When the determination result is no, the digital control circuit 122 returns to step S310. On the other hand, when the determination result is yes, the digital control circuit 122 executes a battery disconnection detection (as shown in step S320).

Figure 4:
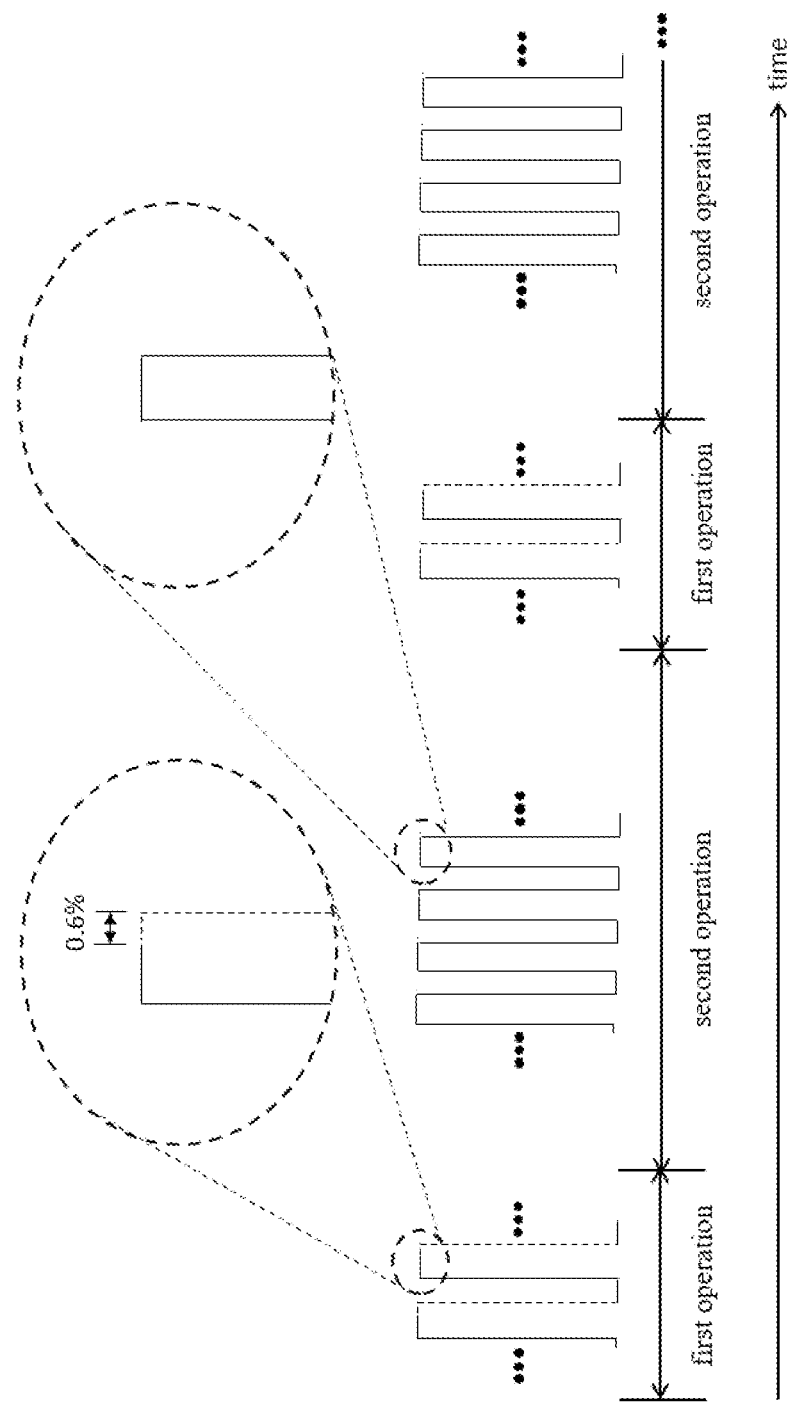
FIG. 4 illustrates the first operation and the second operation.

The battery disconnection detection comprises the following steps: first, the digital control circuit 122 alternately performs a first operation and a second operation on the PWM signal (as shown in step S322). FIG. 4 illustrates the first operation and the second operation. Referring to FIG. 4, the first operation is increasing the duty cycle of the PWM signal by a first preset value for a first preset time. In this embodiment, the first preset value is 6%. Assuming that an original duty cycle of the PWM signal is 50%, then the adjusted duty cycle is 56%. In addition, the second operation is reverting the PWM signal to the original duty cycle for a second preset time. In this embodiment, it is to adjust the duty cycle of the PWM signal from 56% to 50%. Furthermore, in this embodiment, the first preset time is 10 milliseconds (i.e., 10 ms), and the second preset time is 30 ms. However, this is just for example, not to limit the present invention. In addition, a preferred range of the first preset value is 0.6%-1%, but this is not intended to limit the present invention. It is worth mentioning that, as shown in FIG. 4, the first operation and the second operation are adjacent to each other in time.

Please refer to FIGS. 1 and 3. Since the duty cycle of the PWM signal is used to control the output voltage of the charging circuit 114, the charging circuit 114 can output some extra energy by alternately performing the first operation and the second operation on the PWM signal. In the case where the first preset value, the first preset time and the second preset time are properly designed, if the battery 116 is not disconnected, the extra energy outputted by the charging circuit 114 will be absorbed by the battery 116. As a result, the voltage V2 at the output terminal of the charging circuit 114 will not rise. Conversely, if the battery 116 is disconnected, the extra energy outputted by the charging circuit 114 cannot be absorbed by the battery 116. As a result, the voltage V2 at the output terminal of the charging circuit 114 will rise.

Based on the above, after step S322 is executed, the digital control circuit 122 determines whether the voltage at the output terminal of the charging circuit 114 rises and reaches a second preset value according to the sensing result outputted by the sensing circuit 118 (as shown in step S324). When the voltage V2 at the output terminal of the charging circuit 114 reaches the second preset value, the digital control circuit 122 determines that the battery 116 is disconnected (as shown in step S326). On the other hand, when the voltage V2 at the output terminal of the charging circuit 114 does not reach the second preset value, the digital control circuit 122 determines that the battery 116 is not disconnected (as shown in step S328), and then returns to step S322.

Figure 5:
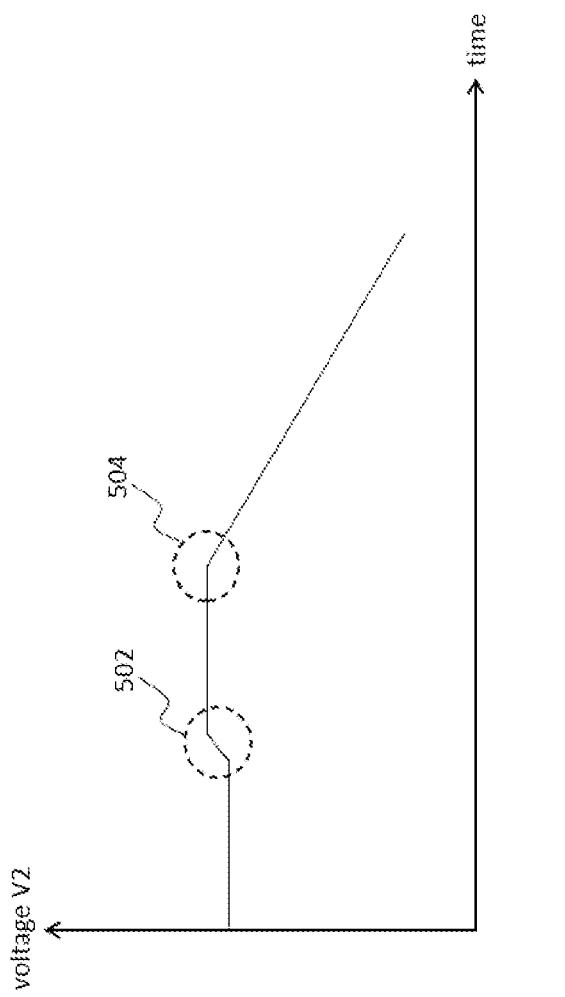
FIG. 5 illustrates the change of the voltage V2 at the output terminal of the charging circuit 114.

FIG. 5 illustrates the change of the voltage V2 at the output terminal of the charging circuit 114. As shown in FIG. 5, in the case where the extra energy outputted by the charging circuit 114 cannot be absorbed by the battery 116, the voltage V2 at the output terminal of the charging circuit 114 will rise (as shown by mark 502), so it can be determined that the battery 116 is disconnected. Once it is determined that the battery 116 is disconnected, the charging circuit 114 can be turned off to prevent further energy wastage. Therefore, the voltage V2 at the output terminal of the charging circuit 114 starts to drop (as shown by mark 504).

Please refer to FIGS. 1 and 3 again. In order to further confirming that the battery 116 is fully charged, or nearly fully charged, in step S310, the digital control circuit 122 can not only determine whether the charging circuit 114 is in the constant voltage charging mode, but also determine whether the charging current outputted by the charging circuit 114 is less than a preset current value (for example, 0.3 amperes, i.e., 0.3 A, but this is not intended to limit this invention) according to the sensing result outputted by the sensing circuit 118. When all are determined to be yes, the digital control circuit 122 executes the battery disconnection detection.

Please refer to FIG. 4 again. It can also be seen from FIG. 4 that even if the original duty cycle of the PWM signal is 0, the aforementioned first operation and second operation can also be implemented. In other words, even if the original duty cycle of the PWM signal is 0, the method of the present invention can still be implemented to detect whether the battery 116 is disconnected.

Figure 6:
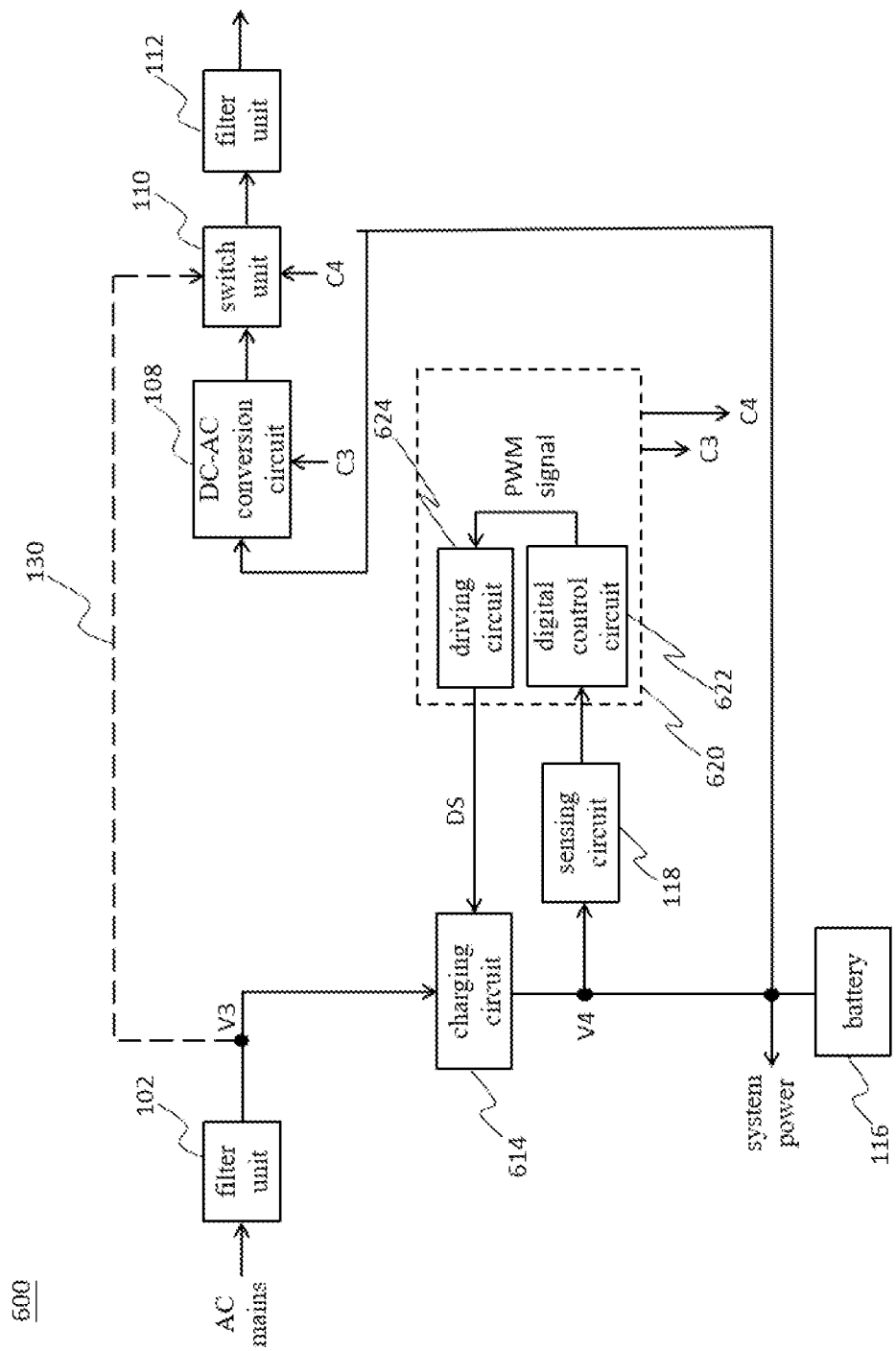
FIG. 6 illustrates an offline UPS according to an embodiment of the present invention.

FIG. 6 illustrates an offline UPS according to an embodiment of the present invention. As shown in FIG. 6, the offline UPS 600 comprises a filter unit 102, a DC-AC conversion circuit 108, a switch unit 110, a filter unit 112, a charging circuit 614, a battery 116, a sensing circuit 118, a control unit 620 and a bypass path 130, wherein the control unit 620 comprises a digital control circuit 622 and a driving circuit 624. An input terminal of the filter unit 102 is used as an input terminal of the offline UPS 600 and is electrically coupled to AC mains, and an output terminal of the filter unit 112 is used as an output terminal of the offline UPS 600. The electrical coupling relationship of the above-mentioned elements is shown in FIG. 6, which will not be repeated here. In addition, although in this embodiment, the battery 116 is configured inside the offline UPS 600, this is not intended to limit the present invention. Those skilled in the art should know that the battery 116 can also be configured outside the offline UPS 600.

The control unit 620 uses the control signals C3 and C4 to respectively control the operation of the DC-AC conversion circuit 108 and the switch unit 110. For example, the control unit 120 uses the control signal C4 to control the operation of the switch unit 110, so as to electrically couple an input terminal of the filter unit 112 to an output terminal of the DC-AC conversion circuit 108, or to electrically couple the input terminal of the filter unit 112 to the bypass path 130.

In this embodiment, the charging circuit 614 is configured for performing an AC-DC conversion operation, and an output of the charging circuit 614 is used to charge the battery 116. In addition, the output of the charging circuit 614 is also used as a system power. In other words, in addition to the battery 116, the output terminal of the charging circuit 614 is also electrically coupled to at least one load, and these loads depend on the system power for normal operation. The sensing circuit 118 is configured for sensing an output (for example, sensing voltage and current) of the charging circuit 614 to generate a sensing result. The digital control circuit 622 is configured for generating a pulse-width modulation signal (PWM signal) according to the sensing result. A duty cycle of the PWM signal is used to control an output voltage of the charging circuit 614. In addition, in this embodiment, the digital control circuit 622 further has a function of stabilizing the output voltage of the charging circuit 614. This function can stabilize the output voltage of the charging circuit 614 at a target level. The driving circuit 624 is configured for generating a driving signal DS to drive the charging circuit 614 according to the PWM signal.

Figure 7:
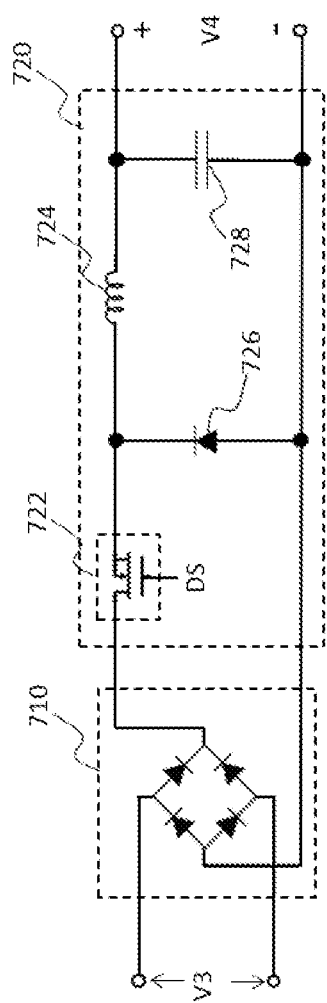
FIG. 7 illustrates one embodiment of the charging circuit 614.

FIG. 7 illustrates one embodiment of the charging circuit 614. As shown in FIG. 7, the charging circuit 614 is composed of a full-bridge rectifier 710 and a step-down DC-DC conversion circuit 720, wherein the step-down DC-DC conversion circuit 720 comprises a switch 722, an inductor 724, a diode 726 and a capacitor 228. In addition, in this embodiment, the switch 722 is implemented by an N-type metal-oxide-semiconductor field-effect transistor (i.e., N-type MOSFET). A gate of the N-type MOSFET is used as a control terminal of the switch 722 and used for receiving the driving signal DS outputted by the driving circuit 624. In addition, in FIG. 7, V3 represents a voltage at an input terminal of the charging circuit 614, and V4 represents a voltage at the output terminal of the charging circuit 614. The electrical coupling relationship of the above-mentioned components is shown in FIG. 7, which will not be repeated here. It is worth mentioning that, in other embodiments, the charging circuit 614 may also be implemented by a combination of a full-bridge rectifier and a step-up DC-DC conversion circuit.

Figure 8:
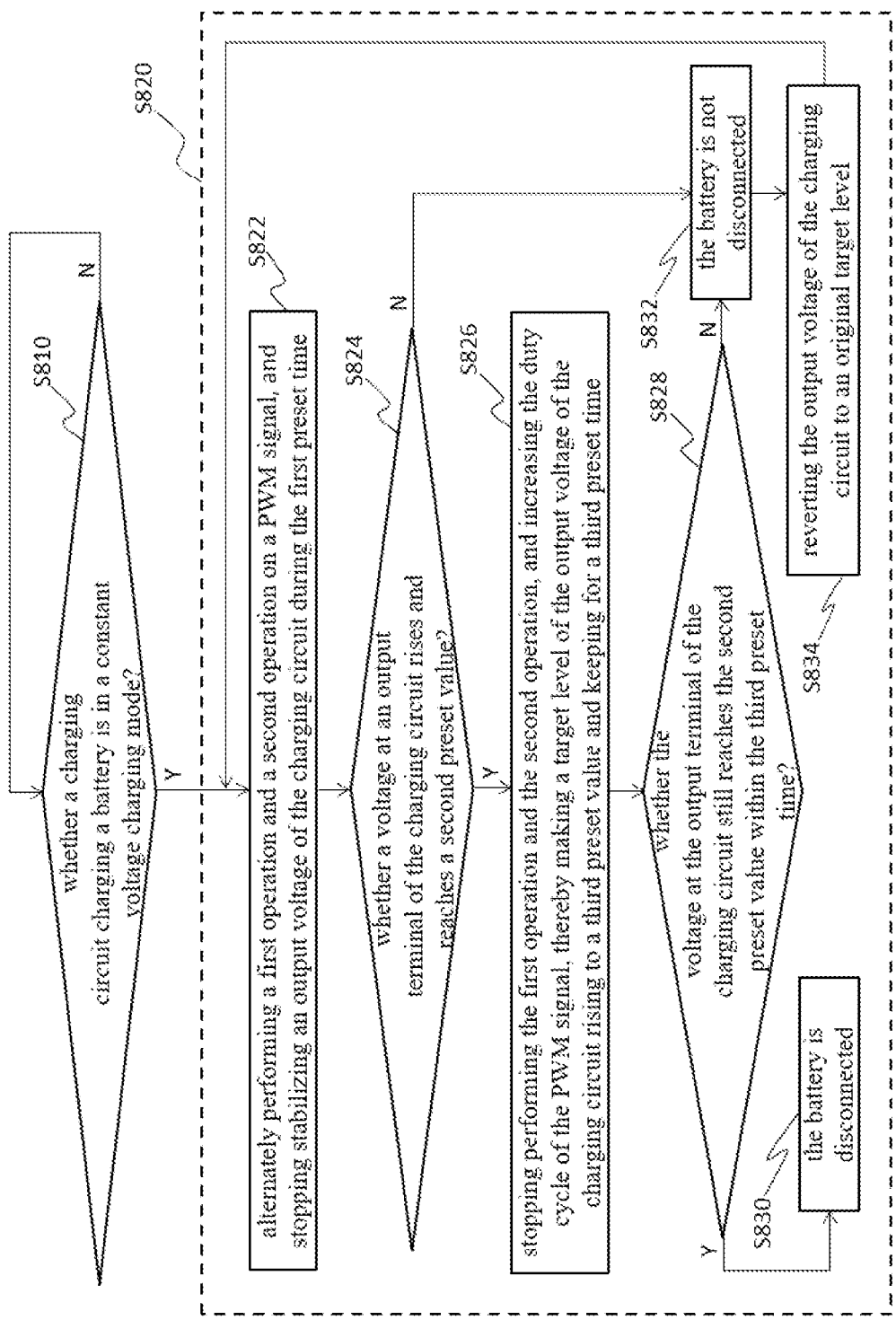
FIG. 8 is a flowchart of a method for detecting whether a battery is disconnected according to an embodiment of the present invention.

FIG. 8 is a flowchart of a method for detecting whether a battery is disconnected according to an embodiment of the present invention. Please refer to FIGS. 6 and 8. First, the digital control circuit 622 determines whether the charging circuit 614 is in the constant voltage charging mode according to the sensing result outputted by the sensing circuit 118 (as shown in step S810). When the charging circuit 614 is in the constant voltage charging mode, it means that the battery 116 is fully charged, or nearly fully charged. In this embodiment, the digital control circuit 622 can obtain information related to the voltage V4 at the output terminal of the charging circuit 614 from the sensing result, and determine whether the charging circuit 614 is in the constant voltage charging mode. When the determination result is no, the digital control circuit 622 returns to step S810. On the other hand, when the determination result is yes, the digital control circuit 622 executes a battery disconnection detection (as shown in step S820).

The battery disconnection detection comprises the following steps: first, the digital control circuit 622 alternately performs a first operation and a second operation on the PWM signal (as shown in step S822). The first operation is increasing the duty cycle of the PWM signal by a first preset value for a first preset time. Since the output of the charging circuit 614 is also used as a system power, in this embodiment, the first preset value is increased to 35%. Assuming that an original duty cycle of the PWM signal is 50%, then the adjusted duty cycle is 85%. In addition, the second operation is reverting the PWM signal to the original duty cycle for a second preset time. In this embodiment, it is to adjust the duty cycle of the PWM signal from 85% to 50%.

In this embodiment, the first preset time is 10 ms, and the second preset time is 30 ms. However, this is not intended to limit the present invention. For example, for offline UPSs of different models, the first preset time can be greater than or equal to 1 second, and the second preset time can be greater than or equal to 2 seconds. Furthermore, in the case where the output of the charging circuit 614 is also used as the system power, a preferred value of the first preset value is greater than or equal to 35%, but this is not intended to limit the present invention. In addition, in step S822, the digital control circuit 622 also stops the function of stabilizing the output voltage of the charging circuit 614 during the first preset time.

Please refer to FIGS. 6 and 8. Since the duty cycle of the PWM signal is used to control the output voltage of the charging circuit 614, the charging circuit 614 can output some extra energy by alternately performing the first operation and the second operation on the PWM signal. In the case where the first preset value, the first preset time and the second preset time are properly designed, if the battery 116 is not disconnected, the extra energy outputted by the charging circuit 614 will be absorbed by the battery 116. As a result, the voltage V4 at the output terminal of the charging circuit 614 will not rise. Conversely, if the battery 116 is disconnected, the extra energy outputted by the charging circuit 614 cannot be absorbed by the battery 116. As a result, the voltage V4 at the output terminal of the charging circuit 614 will rise.

Based on the above, after step S822 is executed, the digital control circuit 622 determines whether the voltage at the output terminal of the charging circuit 614 rises and reaches a second preset value according to the sensing result outputted by the sensing circuit 118 (as shown in step S824). When the voltage V4 at the output terminal of the charging circuit 614 reaches the second preset value, the digital control circuit 622 stops performing the first operation and the second operation, and increases the duty cycle of the PWM signal, thereby making a target level of the output voltage of the charging circuit 614 rising to a third preset value and keeping for a third preset time (as shown in step S826). Wherein, the third preset value is greater than the second preset value. In addition, the third preset time is, for example, 1 second. The reason for raising the target level of the output voltage of the charging circuit 614 to the third preset value is mainly because there are other loads consuming the system power, so that even if the voltage V4 at the output terminal of the charging circuit 614 rises and reaches the second preset value, the voltage V4 will soon drop again and cannot keep at the second preset value. As a result, it is impossible to determine whether the battery 116 is disconnected.

After step S826 is executed, the digital control circuit 622 determines whether the voltage V4 at the output terminal of the charging circuit 614 still reaches the second preset value within the third preset time (as shown in step S828). When it is determined that the voltage V4 at the output terminal of the charging circuit 614 reaches the second preset value within the third preset time, the digital control circuit 622 determines that the battery 116 is disconnected (as shown in step S830). On the other hand, when it is determined that the voltage V4 at the output terminal of the charging circuit 614 does not reach the second preset value within the third preset time, the digital control circuit 622 determines that the battery 116 is not disconnected (as shown in step S832). Once the digital control circuit 622 determines that the battery 116 is not disconnected, the digital control circuit 622 reverts the output voltage of the charging circuit 614 to an original target level (as shown in step S834), and then returns to step S822.

In addition, in step S824, when the determination result is no, the digital control circuit 622 also determines that the battery 116 is not disconnected (as shown in step S832). Next, the digital control circuit 622 reverts the output voltage of the charging circuit 614 to the original target level (as shown in step S834). Since the target level of the output voltage of the charging circuit 614 is not changed in steps S822, S824 and S832, the target level of the output voltage of the charging circuit 614 will not be changed in step S834.

Figure 9:
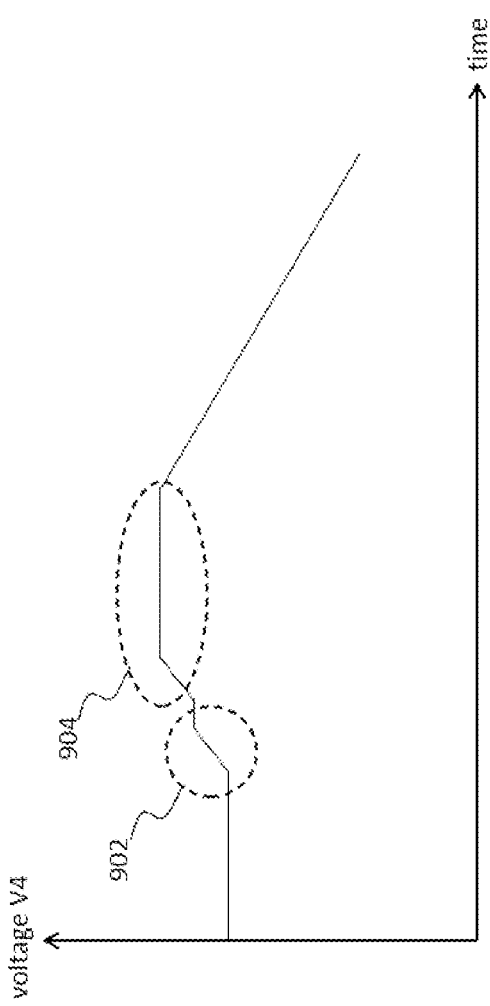
FIG. 9 illustrates the change of the voltage V4 at the output terminal of the charging circuit 614.

FIG. 9 illustrates the change of the voltage V4 at the output terminal of the charging circuit 614. As shown in FIG. 9, in the case where the extra energy outputted by the charging circuit 614 cannot be absorbed by the battery 116, the voltage V4 at the output terminal of the charging circuit 614 will rise (as shown by mark 902). And when the voltage V4 at the output terminal of the charging circuit 614 reaches the second preset value, the digital control circuit 622 stops performing the first operation and the second operation, and makes the target level of the output voltage of the charging circuit 614 rise to a third preset value and keep for a third preset time. The result is shown in mark 904. Therefore, as long as the voltage V4 at the output terminal of the charging circuit 614 still reaches the second preset value within the third preset time, it can be determined that the battery 116 is disconnected. And once it is determined that the battery 116 is disconnected, the charging circuit 614 can be turned off to prevent further energy wastage. Therefore, the voltage V4 at the output terminal of the charging circuit 614 starts to drop.

It is worth mentioning that, in a preferred embodiment, the voltage difference between the third preset value and the second preset value is equal to the voltage difference between the second preset value and the original target level of the output voltage of the charging circuit 614. Assuming that the original target level of the output voltage of the charging circuit 614 is set to 55.2V, and the second preset value is set to 56V, then the third preset value is preferably set to 56.8V to more effectively detect the extra energy outputted by the charging circuit 614.

Please refer to FIGS. 6 and 8 again. In order to further confirming that the battery 116 is fully charged, or nearly fully charged, in step S810, the digital control circuit 622 can not only determine whether the charging circuit 614 is in the constant voltage charging mode, but also determine whether the charging current outputted by the charging circuit 614 is less than a preset current value (for example, 0.3 A, but this is not intended to limit this invention) according to the sensing result outputted by the sensing circuit 118. When all are determined to be yes, the digital control circuit 622 executes the battery disconnection detection. Certainly, for offline UPSs of different models, the preset current value can also be other values, such as 0.5 A. In general, the preset current value can be set as the current value when the charging circuit 614 enters a float charging state.

It is worth mentioning that although the above embodiments are based on the online UPS and the offline UPS as examples, this is not intended to limit the present invention. Those skilled in the art should know that the method of the present invention can also be applied to a line-interactive uninterruptible power system (line-interactive UPS), or even to other electronic devices.

To sum up, since the method of the present invention is alternately performing the first operation and the second operation on the PWM signal controlling the output voltage of the charging circuit when the charging circuit is in the constant voltage charging mode, and determining whether the battery is disconnected according to the voltage change at the output terminal of the charging circuit, the method can solve the issues that the conventional technology cannot detect whether the battery is disconnected when the battery is fully charged or nearly fully charged.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting whether a battery is disconnected, comprising the following steps:
   determining whether a charging circuit charging a battery is in a constant voltage charging mode; and
   executing a battery disconnection detection when a determination result is yes, the battery disconnection detection comprising the following steps:
      alternately performing a first operation and a second operation on a PWM signal, wherein a duty cycle of the PWM signal is used to control an output voltage of the charging circuit, the first operation is increasing the duty cycle of the PWM signal by a first preset value for a first preset time, and the second operation is reverting the PWM signal to an original duty cycle for a second preset time; and
      determining whether a voltage at an output terminal of the charging circuit rises and reaches a second preset value.

2. The method as claimed in claim 1, further comprising the steps of: determining whether a charging current outputted by the charging circuit is less than a preset current value, and executing the battery disconnection detection when it is determined to be yes.

3. The method as claimed in claim 2, wherein the preset current value is 0.3 A.

4. The method as claimed in claim 1, wherein the first preset time is 10 ms, and the second preset time is 30 ms.

5. The method as claimed in claim 1, wherein the first preset value is 0.6%-1%.

6. The method as claimed in claim 5, wherein it is determined that the battery is disconnected when the voltage at the output terminal of the charging circuit reaches the second preset value, and it is determined that the battery is not disconnected when the voltage at the output terminal of the charging circuit does not reach the second preset value.

7. The method as claimed in claim 1, wherein the output terminal of the charging circuit is further electrically coupled to at least one load, and the first preset value is greater than or equal to 35%.

8. The method as claimed in claim 7, further comprising stopping stabilizing the output voltage of the charging circuit during the first preset time, and comprising stopping performing the first operation and the second operation when the voltage at the output terminal of the charging circuit reaches the second preset value, and increasing the duty cycle of the PWM signal, thereby making a target level of the output voltage of the charging circuit rising to a third preset value and keeping for a third preset time, wherein the third preset value is greater than the second preset value.

9. The method as claimed in claim 8, wherein it is further determined whether the voltage at the output terminal of the charging circuit still reaches the second preset value within the third preset time after the target level of the output voltage of the charging circuit increases to the third preset value, when it is determined to be yes, it means that the battery is disconnected, and when it is determined to be no, it means that the battery is not disconnected.

10. The method as claimed in claim 9, wherein when it is determined that the voltage at the output terminal of the charging circuit does not reach the second preset value within the third preset time, the output voltage of the charging circuit is reverted to an original target level, and the first operation and the second operation are re-executed alternately.

11. The method as claimed in claim 10, wherein the voltage difference between the third preset value and the second preset value is equal to the voltage difference between the second preset value and the original target level of the output voltage of the charging circuit.

12. An online UPS, comprising:
   a charging circuit, for performing a DC-DC conversion operation and for charging a battery;
   a sensing circuit, for sensing an output of the charging circuit to generate a sensing result; and
   a control unit, comprising:
      a digital control circuit, for generating a PWM signal according to the sensing result, a duty cycle of the PWM signal being used to control an output voltage of the charging circuit; and a driving circuit, for generating a driving signal to drive the charging circuit according to the PWM signal, wherein when the digital control circuit determines that the charging circuit is in a constant voltage charging mode according to the sensing result, the digital control circuit executes a battery disconnection detection, and the battery disconnection detection comprises the following steps:

alternately performing a first operation and a second operation on the PWM signal, wherein the first operation is increasing the duty cycle of the PWM signal by a first preset value for a first preset time, and the second operation is reverting the PWM signal to an original duty cycle for a second preset time; and determining whether the voltage at the output terminal of the charging circuit rises and reaches a second preset value.

13. The online UPS as claimed in claim 12, wherein the digital control circuit further determines whether a charging current outputted by the charging circuit is less than a preset current value, and executes the battery disconnection detection when it is determined to be yes.

14. The online UPS as claimed in claim 13, wherein the preset current value is 0.3 A.

15. The online UPS as claimed in claim 12, wherein the first preset time is 10 ms, and the second preset time is 30 ms.

16. The online UPS as claimed in claim 12, wherein the first preset value is 0.6%-1%.

17. The online UPS as claimed in claim 16, wherein when the voltage at the output terminal of the charging circuit reaches the second preset value, the digital control circuit determines that the battery is disconnected, and when the voltage at the output terminal of the charging circuit does not reach the second preset value, the digital control circuit determines that the battery is not disconnected.

18. An offline UPS, comprising:

a charging circuit, for performing an AC-DC conversion operation, an output of the charging circuit being used to charge a battery and used as a system power;

a sensing circuit, for sensing the output of the charging circuit to generate a sensing result; and a control unit, comprising:

a digital control circuit, for generating a PWM signal according to the sensing result, a duty cycle of the PWM signal being used to control an output voltage of the charging circuit, wherein the digital control circuit further has a function of stabilizing the output voltage of the charging circuit; and a driving circuit, for generating a driving signal to drive the charging circuit according to the PWM signal, wherein when the digital control circuit determines that the charging circuit is in a constant voltage charging mode according to the sensing result, the digital control circuit executes a battery disconnection detection, and the battery disconnection detection comprises the following steps:

alternately performing a first operation and a second operation on the PWM signal, wherein the first operation is increasing the duty cycle of the PWM signal by a first preset value for a first preset time, and stopping the function of stabilizing the output voltage of the charging circuit during the first preset time, and the second operation is reverting the PWM signal to an original duty cycle for a second preset time;

determining whether a voltage at an output terminal of the charging circuit rises and reaches a second preset value;

stopping performing the first operation and the second operation when the voltage at the output terminal of the charging circuit reaches the second preset value, and increasing the duty cycle of the PWM signal, thereby making a target level of the output voltage of the charging circuit rising to a third preset value and keeping for a third preset time, wherein the third preset value is greater than the second preset value; and determining whether the voltage at the output terminal of the charging circuit still reaches the second preset value within the third preset time.

19. The offline UPS as claimed in claim 18, wherein the digital control circuit further determines whether a charging current outputted by the charging circuit is less than a preset current value, and executes the battery disconnection detection when it is determined to be yes.

20. The offline UPS as claimed in claim 19, wherein the preset current value is 0.3 A.

21. The offline UPS as claimed in claim 18, wherein the first preset time is 10 ms, and the second preset time is 30 ms.

22. The offline UPS as claimed in claim 18, wherein the first preset value is greater than or equal to 35%.

23. The offline UPS as claimed in claim 18, wherein when it is determined that the voltage at the output terminal of the charging circuit reaches the second preset value within the third preset time, the digital control circuit determines that the battery is disconnected, and when it is determined that the voltage at the output terminal of the charging circuit does not reach the second preset value within the third preset time, the digital control circuit determines that the battery is not disconnected.

24. The offline UPS as claimed in claim 23, wherein when it is determined that the voltage at the output terminal of the charging circuit does not reach the second preset value within the third preset time, the digital control circuit reverts the output voltage of the charging circuit to an original target level, and re-executes the first operation and the second operation alternately.

25. The offline UPS as claimed in claim 24, wherein the voltage difference between the third preset value and the second preset value is equal to the voltage difference between the second preset value and the original target level of the output voltage of the charging circuit.

* * * * *